United States Patent [19]

Iwasaki et al.

[11] Patent Number: 5,450,423
[45] Date of Patent: Sep. 12, 1995

[54] DATA ERROR CORRECTING/DETECTING SYSTEM AND APPARATUS COMPATIBLE WITH DIFFERENT DATA BIT MEMORY PACKAGES

[75] Inventors: Kazuya Iwasaki; Hiroshi Kosuge; Yoshio Kiriu; Ryoichi Kurihara, all of Hadano, Japan

[73] Assignees: Hitachi, Ltd.; Hitachi Computer Electronics Co., Ltd.

[21] Appl. No.: 852,954

[22] Filed: Mar. 17, 1992

[30] Foreign Application Priority Data

Mar. 19, 1991 [JP] Japan .................. 3-078228

[51] Int. Cl.$^6$ ................................ G06F 11/10
[52] U.S. Cl. .................... 371/40.1; 371/40.2
[58] Field of Search .................. 371/37–40.4

[56] References Cited

U.S. PATENT DOCUMENTS

| | | | |
|---|---|---|---|
| 4,862,463 | 8/1989 | Chen | 371/38 |
| 4,953,164 | 8/1990 | Asakura et al. | 371/40.1 |
| 5,058,116 | 10/1991 | Chao et al. | 371/40.2 |
| 5,195,101 | 3/1993 | Guenthner et al. | 371/68.3 |
| 5,249,282 | 9/1993 | Segers | 395/425 |
| 5,291,498 | 3/1994 | Jackson et al. | 371/40.1 |

FOREIGN PATENT DOCUMENTS 61-139846  6/1986  Japan .

OTHER PUBLICATIONS

S. Kaneda, "A Class of Odd-Weight-Column SEC-DED-SbED Codes for Memory System" Paper of the Institute of Electronic Communication Engineers of Japan. vol. J67 DNo. 5, May, 1984.

Primary Examiner—Roy N. Envall, Jr.
Assistant Examiner—Thomas E. Brown
Attorney, Agent, or Firm—Fay, Sharpe, Beall, Fagan, Minnich & McKee

[57] ABSTRACT

Memory expansion using memory packages of different generations is performed without unnecessarily increasing the minimum memory capacity of a memory device and while obtaining a high error detecting ability and high reliability. In expanding the capacity of a memory device by using first generation 1M×1 bit IC memory packages, second generation 4M×4 bits IC memory packages, or third generation 16M×8 bits IC memory packages, the total code length is set to 40 bits, a 4's multiple, within a range longer than the total code length necessary for S4ED and shorter than the total code length necessary for S8ED, and a reduced code is used for enhancing the S8ED function. In this manner, wasteful first generation IC memory packages can be reduced in number, and the error detecting ability of a memory device using third generation memory packages can be retained substantially the same as that of a memory device using first generation memory packages.

4 Claims, 5 Drawing Sheets

| BIT STRUCTURE OF IC MEMORY PACKAGE USED FOR MEMORY DEVICE / MINIMUM MEMORY CAPACITY | FIRST GENERATION | SECOND GENERATION | | | THIRD GENERATION | | |
|---|---|---|---|---|---|---|---|
| | 1 M BITS | 4 M BITS | | | 16 M BITS | | |
| | ×1 BIT | ×1 BIT | ×4 BITS | ×8 BITS | ×1 BIT | ×4 BITS | ×8 BITS |
| 4 MB | 40 PACKAGES / 40 BITS | → | 10 PACKAGES / 40 BITS | | | | |
| 8 MB | | | | | | | 5 PACKAGES / 40 BITS |
| 16 MB | | | | | | | |
| 32 MB | | | | | | | |
| 64 MB | | | | | | | |

NOTE: FRACTION INDICATES $\dfrac{\text{NUMBER OF IC MEMORY PACKAGES}}{\text{TOTAL CODE LENGTH}}$

FIG.1

| BIT STRUCTURE OF IC MEMORY PACKAGE USED FOR MEMORY DEVICE / MINIMUM MEMORY CAPACITY | FIRST GENERATION | SECOND GENERATION | | | THIRD GENERATION | | |
|---|---|---|---|---|---|---|---|
| | 1 M BITS | 4 M BITS | | | 16 M BITS | | |
| | ×1 BIT | ×1 BIT | ×4 BITS | ×8 BITS | ×1 BIT | ×4 BITS | ×8 BITS |
| 4 MB | 40 PACKAGES / 40 BITS | | | | | | |
| 8 MB | | | 10 PACKAGES / 40 BITS | | | | 5 PACKAGES / 40 BITS |
| 16 MB | | | | | | | |
| 32 MB | | | | | | | |
| 64 MB | | | | | | | |

NOTE: FRACTION INDICATES NUMBER OF IC MEMORY PACKAGES / TOTAL CODE LENGTH

FIG.3

FIG.4(a)
| | DATA BIT d00-31 | | | | CHECK BIT |
|---|---|---|---|---|---|
| BYTE | 0 | 1 | 2 | 3 | C |
| BIT | 01234567 | 01234567 | 01234567 | 01234567 | 01234567 |
FIG.4(b)
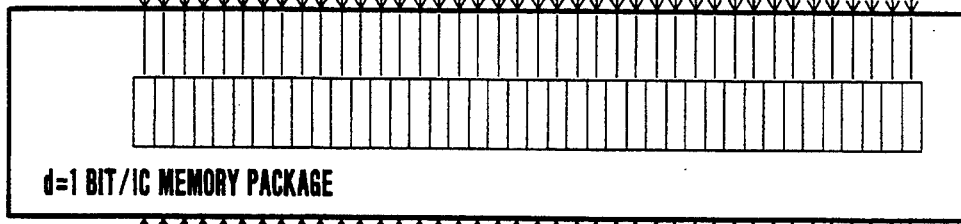
d=1 BIT/IC MEMORY PACKAGE
FIG.4(c)
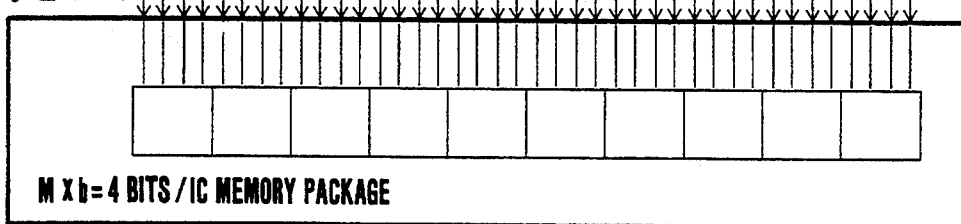
M X b = 4 BITS/IC MEMORY PACKAGE
FIG.4(d)
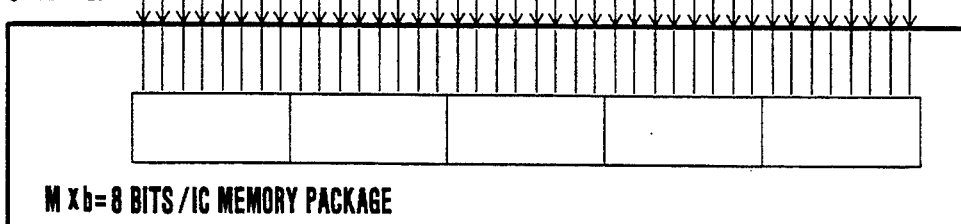
M X b = 8 BITS/IC MEMORY PACKAGE

FIG.5 PRIOR ART

| BIT STRUCTURE OF IC MEMORY PACKAGE USED FOR MEMORY DEVICE / MINIMUM MEMORY CAPACITY | FIRST GENERATION 1 M BITS | | SECOND GENERATION 4 M BITS | | | THIRD GENERATION 16 M BITS | | |
|---|---|---|---|---|---|---|---|---|
| | ×1 BIT | | ×1 BIT | ×4 BITS | ×8 BITS | ×1 BIT | ×4 BITS | ×8 BITS |
| 4 MB | 39 PACKAGES / 39 BITS | | | 10 PACKAGES / 39 BITS (1 BITS) | | | | 6 PACKAGES / 42 BITS (6 BITS) |
| 8 MB | | 39 PACKAGES / 39 BITS | | | | | | |
| 16 MB | | | | | | | 10 PACKAGES / 39 BITS (1 BIT) | |
| 32 MB | | | | | | | | |
| 64 MB | | | | | | 39 PACKAGES / 39 BITS | | |

NOTE: FRACTION INDICATES $\frac{\text{NUMBER OF IC MEMORY PACKAGES}}{\text{TOTAL CODE LENGTH (UNUSED BIT)}}$

DATA ERROR CORRECTING/DETECTING SYSTEM AND APPARATUS COMPATIBLE WITH DIFFERENT DATA BIT MEMORY PACKAGES

BACKGROUND OF THE INVENTION

The present invention relates to a system and apparatus for correcting/detecting data error of a memory device, and more particularly to a system and apparatus for reliably correcting/detecting data error of a memory device even if the memory device is constructed of IC memory packages having different input/output data bit numbers.

Generally, a memory device, using IC memory packages (chips) has been constructed having a number of IC memory packages of one-bit input/output data structure, in order to improve integration density by reducing the number of pins on an IC memory package. However, as recent IC memories are becoming highly integrated, IC memory packages of b bit input/output data structure (b is an integer of 3 or larger, e.g., b=4) are often used. A memory device using IC memory packages of b bit input/output data structure has the following problem. Namely, even if one of the IC memory packages becomes faulty, there is a possibility of multiple bit errors within an n bit block outputted from the faulty IC package.

Recently, a method of correcting/detecting data error of such a memory device has been proposed which uses SEC-DED-SbED codes (Single Error Correcting-Double Error Detecting-Single (b) bit byte Error Detecting codes) allowing to correct on bit error, detect two bit errors, and detect three or more bit errors within the same b bit block.

Such conventional error correcting/detecting methods are known for example as:

(1) a method using codes disclosed in a paper entitled "Byte Error Detecting Code for Semiconductor Memory Device" by Kaneda, written in one of the papers Vol.J67-D No.5, May, 1984, of The Institute of Electronics and Communication Engineers of Japan, and (2) a method using codes disclosed in JP-A-6-139846 or other publications, these codes being constructed by rotating a b=b matrix by an optional number (g) of bits in the column direction and by consecutively placing sub-matrices.

A memory device using a plurality of IC memory packages according the conventional technique is beginning to have a problem of too large a minimum unit of memory capacity, because a more recent IC memory package has a large capacity and high integration (current integration rate is about four times in three years).

In order to solve such a problem, a memory device has been proposed which uses IC memory packages of multiple bit input/output data structure so that the number of IC packages of the memory device can be reduced and the minimum unit of memory capacity can be prevented from becoming too large. However, such a memory device has a high possibility of generation of multiple bit errors if one IC memory package becomes faulty. An ability to detecting such multiple bit errors has not been considered in spite of memory expansion by the generation change of IC packages. It is therefore difficult to reliably deal with the generation change of IC memory packages. This point will be further discussed with reference to FIG. 5.

FIG. 5 is a diagram showing an example of a conventional memory expansion method.

A memory device is assumed to be constructed as having a 4-byte (32 bits) data width for example as shown in FIG. 5.

If a memory device is constructed of IC memory packages of one-bit input/output data structure, it is necessary to allow correction of one bit error and detection of two bit errors. Seven check bits are therefore required. The total code length of the memory device becomes 39 bits, and so the memory device can be constructed using thirty nine IC memory packages.

In this case, if thirty-nine 1 mega ×1 bit dynamic RAM (hereinafter called DRAM) packages of the first generation are used as IC memory packages, the minimum unit of memory capacity of the memory device becomes 4 megabytes (MB). Similarly, if thirty nine 4 M ×1 bit DRAM packages of the second generation are used, the minimum unit of memory capacity of the memory device becomes 16 MB. If thirty nine 16 M×1 bit DRAM packages of the third generation are used, the minimum unit of memory capacity of the memory device becomes 64 MB. In this manner, use of IC memory packages of one-bit input/output structure of each generation results in a large minimum unit of memory capacity of the memory device.

In general, the memory capacity of DRAM increases about four times in three years, whereas the memory capacity required for work stations increases about two times in four years. In this context, it is conceivable that a memory device using first generation 1 M×1 bit DRAM packages of one-bit input/output data structure may be replaced with a memory device using second generation 4 M DRAM packages of 4-bit input/output data structure to thereby reduce the minimum memory capacity to 4 MB, or may be replaced with a memory device using third generation 16 M bit DRAM packages of 8-bit input/output data structure to thereby reduce the minimum memory capacity to 8 MB.

In this case, the memory device using the second generation IC memory packages has a high possibility of occurrence of four bit errors or less if one of the IC memory packages becomes faulty. It is necessary therefore to use SEC-DED-S4ED codes as error correcting-/detecting codes. Use of these codes requires seven check bits, so the total code length becomes thirty nine bits. As a result, the memory device can be constructed using ten IC memory packages, leaving one idle bit.

Similarly, the memory device using the third generation IC memory packages of 8-bit input/output data structure has a high possibility of occurrence of eight bit errors or less if one of the IC memory packages becomes faulty. It is therefore necessary to use SEC-DED-S8ED codes as error correcting/detecting codes. Use of these codes requires ten check bits, so the total code length becomes forty two bits. As a result, the memory device can be constructed using six IC memory packages of 8-bit input/output data structure (total 48 bits), leaving six idle bits. This memory device using the third generation IC memory packages has a different total code length, posing a problem unable to retain connection compatibility with another memory device using the different generation IC memory packages, e.g., of 4-bit input/output data bit.

Apart from the above, as a means for using the common error correcting/detection code length, a memory device may be constructed of five third generation IC memory packages of 8-bit input/output data structure, with the total code length of 39 bits leaving one idle bit, to allow 7-bit error correcting/detecting codes same as the second generation to be used. However, this memory device has a problem in practical use because the multiple bit error detection factor within each 8-bit block is considerably lowered as small as 74.2%.

On the other hand, consider the case wherein the total code length of the memory device using the first generation IC memory packages of one-bit input/output data structure, or of the memory device using the second IC memory packages of 4-bit input/output data structure, is set to 42 bits, which is same as the third generation. In this case, three wasteful IC memory packages for the first generation, or one wasteful IC memory package for the second generation, is required to be used uneconomically.

SUMMARY OF THE INVENTION

It is an object of the present invention to provide a data error correcting/detecting system and apparatus, capable of sharing common error correcting/detecting codes with all types of memory devices using memory packages of a plurality of generations, while retaining data reliability.

It is another object of the present invention to provide a data error correcting/detecting system and apparatus capable of efficiently using idle bits generated from a specific relation between the number of input/output data bits of a memory package and the number of bits of an error correcting/detecting code.

It is a further object of the present invention to provide a memory board having an interface allowing compatible connection between memory packages of a plurality of generations.

According to one aspect of the present invention, the error correcting/detecting code length for a memory device using N (N is an integer 2 or larger) IC memory packages of n-bit structure (n is an integer 3 or larger), is set to an n's multiple, within a range longer than the total code length necessary for detecting three or more bit errors in an n-bit block and shorter than the total code length necessary for detecting three or more bit errors in an m-bit block. In addition, a reduced code is used for enhancing an ability of detecting three or more bit errors in the m-bit block.

According to another aspect of the present invention, when using first generation IC memory packages, surplus idle bits are used as error correcting/detecting code for the later generation.

Specifically, consider memory devices using IC memory packages of one-bit structure, n-bit structure, and m-bit structure (1 <n <m), of three different generation. If IC memory packages of one-bit structure are used, excessive IC memory packages are used, and the total code length of a sum of data bits and error correcting/detecting code bits is set to an n's multiple, longer than the total code length necessary for detecting three or more bit errors in an n-bit block and shorter than the total code length necessary for detecting three or more bit errors in an m-bit block. With such an arrangement, the total code length and error correcting/detecting code structure may be used in common with the IC memory packages of different three generations.

According to a memory board of the present invention, input/output interface of the memory board mounting (disposing, wiring or the like) IC memory packages is configured such that the input/output data bits of each IC memory package are physically and consecutively assigned to consecutive bits within each byte of the error correcting/detecting code.

According to the present invention, it is possible to detect at the 100% rate three or more bit errors within an n-bit block, and to detect at a high probability three or more bit errors within an m-bit block. Therefore, without lowering the reliability, a memory device using N IC memory packages of n-bit input/output data structure can be easily replaced with a memory device using M IC memory packages of m-bit input/output data structure. Thus, generation change of memory devices (boards) can be dealt with without using wasteful IC memory packages, and while maintaining a high reliability and a necessary minimum memory capacity.

Furthermore, according to the present invention, for memory devices using IC memory packages of three different generations, even if the input/output data bits are increased for IC memory packages of one generation, the same error/correcting/detecting codes can be used for the IC memory chip packages of other generations, while retaining the error detecting ability. Therefore, it is possible to provide a memory device having a suitable memory capacity over a long period in the future.

Still further, according to the present invention, a memory board is provided having a predetermined relation between the bits of an error correcting/detecting code and the input/output data bits of each IC memory package. It is therefore possible to maintain a high reliability in data error correcting/detecting.

BRIEF DESCRIPTION HE DRAWINGS

FIG. 1 shows an example of a memory expansion method to which the system of the present invention is applied;

FIG. 2 a block diagram showing an example of a data error correcting/detecting apparatus;

FIG. 3 shows an example of a parity matrix of error correcting/detecting codes according to the data error correcting/detecting method of the present invention;

FIG. 4(a), (b), (d), and (d) re diagrams showing examples of an input/output connection interface for a memory board mounting various types of IC memory packages; and FIG. 5 shows an example of a conventional memory expansion method.

DESCRIPTION OF THE PREFERRED EMBODIMENT

Figure 2:
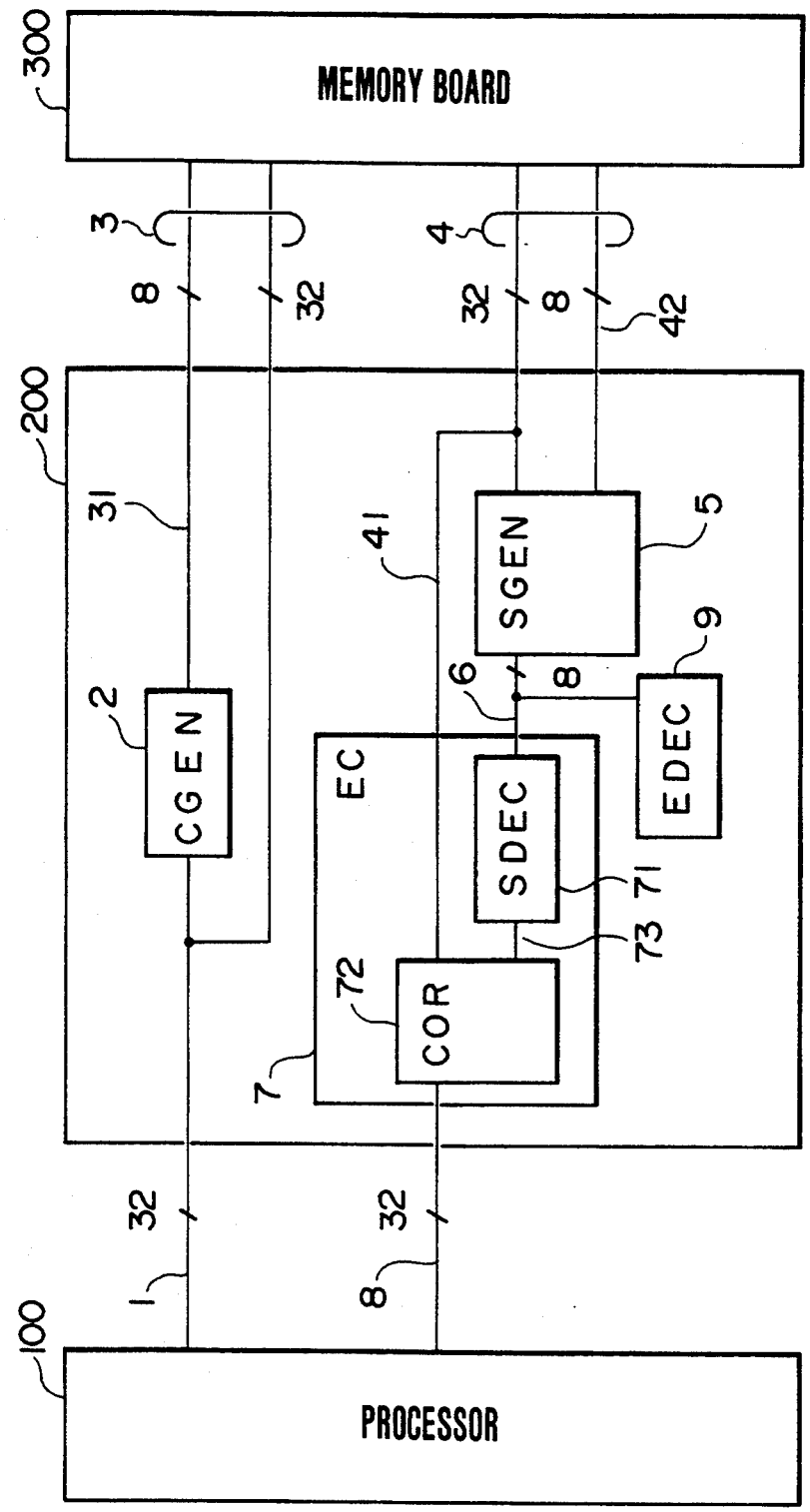

An embodiment of a memory expansion method to which the system of the present invention is applied, will be described in detail.

FIG. 1 shows an embodiment of the memory expansion method to which the system of the present invention is applied, and FIG. 2 is a block diagram showing the structure of a memory device using the memory expansion method of the present invention.

In FIG. 2, numeral 2 represents a check bit generator, numeral 5 represents a syndrome generator, numeral 7 represents an error correcting circuit, numeral 9 represents an error detector, numeral 71 represents a syndrome decoder, numeral 72 represents an error correcting circuit, numeral 100 represents a processor, numeral 200 represents an error correcting/detecting circuit, and numeral 300 represents a memory board.

In the embodiment of the memory expansion method according to the present invention shown in FIG. 1, a memory device of 32-bit (4 bytes) data width is constructed using first generation 1 M bits (1 M×1 bit) IC memory packages, second generation 4 M bits (1 M ×4 bits) IC memory packages, or third generation 16 M bits (2 M×8 bits) IC memory packages. In FIG. 1, the upper three rows show IC memory packages of different generations and their input/output data bit structure, and the leftmost column shows minimum memory capacities of memory devices constructed of IC memory packages of different input/output data bit structures. A numerator of each fraction shown in FIG. 1 indicates the number of IC memory packages used for a memory device, and a denominator indicates the total code length.

In order to reduce the minimum memory capacities of memory devices using IC memory packages of different generations, in the embodiment of the present invention, a memory device is constructed using first generation IC memory packages of one-bit input/output data structure, second generation IC memory packages of 4-bit input/output data structure, or third generation IC memory packages of 8-bit input/output data structure, and the total code length is set to 40 bits, a 4's multiple, longer than the total code length of 39 bits necessary for S4ED function and shorter than the total code length of 42 bits necessary for S8ED function.

With such an arrangement of this embodiment, memory expansion is performed by using forty first generation 1 M×1 bit IC memory packages to set the minimum memory capacity to 4MB, ten second generation 1 M×4 bits IC memory packages to set the minimum memory capacity to 4MB, or five third generation 2 M×8 bits IC memory packages to set the minimum memory capacity to 8 MB.

A particular example of carrying out the method of the present invention will be described in detail.

In the error correcting/detecting apparatus of the present invention shown in FIG. 2, the processor 100 has an ability of processing data of 32-bit width. When writing data from the processor 100 in the memory device, the error correcting/detecting circuit 200 adds an 8-bit error correcting/detecting code to the data, and when reading the data, error is corrected and detected. The memory board 300 has IC memory packages mounted thereon using the memory expansion method using the system of the present invention.

The error correcting/detecting circuit 200 is constructed with the check bit generator (CGEN) 2 as an encoding circuit, the syndrome generator (SGEN) 5, the error correcting circuit (EC) 7, and the error detector (EDEC) 9. EC 7 is constructed with the syndrome decoder (SDEC) 71 and the correcting circuit (COR) 72.

In the memory device shown in FIG.2, for the data write operation, 32-bit data (information) 1 sent from the processor 100 to be coded is inputted to CGEN 2 to generate eight check bits in accordance with error correcting/detecting codes having the total code length of 40 bits. The eight check bits are, added to the data 1 to provide coded write data 4 of 40 bits which is then written in an IC memory package on the memory board 300.

For the data read operation, coded read data 4 read from the memory board 300 is subject to error correcting/detecting because the data may have an error or errors caused by a fault or the like of IC memory packages during the data read/write period.

The 40-bit coded read data 4 is inputted to SGEN 5, and the 32-bit data 41 to be .decoded is inputted to COR 72. SGEN 5 generates 8-bit syndromes in accordance with the error correcting/detecting codes. The generated syndromes 6 are supplied to SDEC 71 and EDEC 9. SEDEC 71 decodes the syndromes 6 in accordance with the error correcting/detecting codes, and if the data 41 contains any correctable error, generates an error position signal 73 which is inputted to COR 72. COR 72 corrects the error in the data 41, and sends a decoded data 8 to the processor 100. If the error position signal 7 is not supplied, COR 72 does not correct, but sends the data 41 itself as the decoded data 8 to the processor 100.

EDEC 9 decodes the inputted syndromes 6 in accordance with the error correcting/detection codes to check if the coded read data 4 is present.

Figure 3:
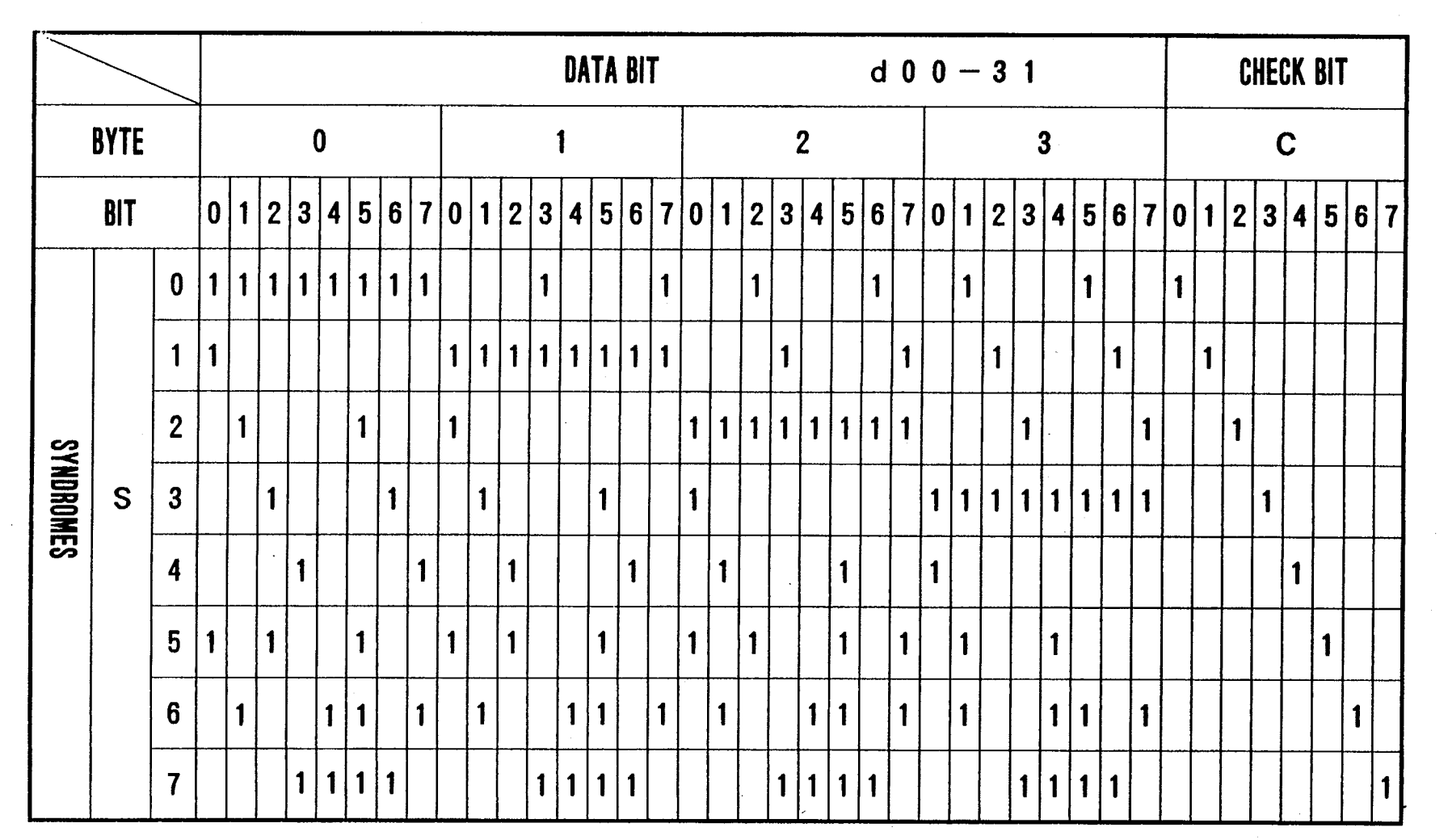

FIG. 3 shows an example of a parity matrix of error correcting/detection codes used by the memory expansion method to which the present invention is applied. This parity matrix is used for the data length of four bytes. In FIG. 3, S0 to S7 represent syndromes, and C0 to C7 represent check bits.

The thirty two data bits d00 to d31 are allocated to bits 0 to 7 of bytes 0 to 3. This parity matrix is constructed as of the total code length of 40 bits. The 40-bit total code length is set to a 4's multiple, longer than the total code=length of 39 bits (including seven check bits) necessary for SEC-DED-S4ED function and shorter than the total code length of 42 bits (including ten check bits) necessary for SEC-DEDS8ED.

The parity matrix is constructed of only different odd-weight-column vectors so as to allow correction of one bit error and detection of two bit errors. In the bytes 0 through 3, sub-matrices constituting the syndromes $0 to $4 at bits 0 to 3 and at 4 to 7, include four matrix patterns obtained by rotating each row of the following 4×4 matrix in the column direction:

$$\begin{bmatrix} 1 & 1 & 1 & 1 \\ & 1 & & \\ & & 1 & \\ & & & 1 \end{bmatrix}$$

Such an arrangement of the parity matrix is provided so as to satisfy the conditions of S4ED. In this case, representing a 4×4 matrix by Xg, a 3-bit error pattern within each 4-bit block by Eo, and a 4-bit error pattern by Ee, the matrix Xg satisfies the conditions of:

(1) weight of each column vector of Xg is 1 or 2,
(2) weight of eo * Xg is 3 or more, and
(3) weight of Ee * Xg is 3 or more.

Such a matrix is contained in each sub-matrix in each block.

Furthermore, this parity matrix is constructed in the following manner in order to improve an ability (S8ED) of detecting multiple bit errors within a range of consecutive two-block eight bits. Namely, sub-matrices containing the 4×4 matrix having the same rotational bit number are consecutively disposed, and in addition, a row with "1" at bit 0 of each byte is rotated and added for each byte.

The syndromes S5 to S7 contain sub-matrices whose contents differ between bits 0 to 3 and bits 4 to 7 and satisfy the odd-weight-column condition, each sub-matrix being given by:

$$\begin{bmatrix} 1 & & & 1 & & & 1 & & \\ & 1 & & & 1 & 1 & & 1 & \\ & & 1 & & 1 & 1 & 1 & & \end{bmatrix}$$

Generally, the error correcting/detecting method using SEC-DED or SEC-DED-SbED codes has a low detecting ability of multiple even bit errors because they can be detected except for all 0s of the syndrome, but has a low detecting ability of multiple odd bit errors because they cannot be detected except when the syndrome becomes other than column vectors of the parity matrix.

According to the parity matrix used by way of example in the present invention, if the weights of the syndromes S0 to S4 are 3 or more, such multiple bit errors can be detected. In the syndromes S0 to S4 of the parity matrix shown in FIG. 3, there is a row with all 1's within the 8-bit block, and the other four rows are formed as a unit matrix. Therefore, if odd bit multiple errors occur within the 8-bit block, the syndrome at the row with all 1's becomes necessarily 1, and two or more of the other syndromes at the four rows have a high possibility of taking 1. As a result, an ability of detecting multiple bit errors within the 8-bit block can be improved.

The parity matrix shown in FIG. 3 provides an error detecting factor of 90.45% for 2-to 8-bit errors of the 8-bit block of each byte within the total code length of 40 bits.

Next, an example of mounting IC memory packages on a memory board according to an embodiment of the present invention will be described with reference to FIGS. 4(a) to 4(d).

FIG. 4(b) is a schematic diagram showing a memory board which mounts forty first generation 1 M bits IC memory packages of one-bit input/output data structure. FIG. 4(c) is a schematic diagram showing a memory board which mounts ten second generation 4 M bits IC memory packages of 4-bit input/output data structure. FIG. 4(d) is a schematic diagram showing a memory board which mounts five third generation IC memory packages of 8-bit input/output data structure. The capacities of these memory devices (boards) are 4 MB, 4 MB, and 8 MB, respectively.

The memory boards shown in FIG. 4(b) to (d) explain an interface between the memory input/output data bits and the codes shown in FIG. 3. The interface is configured such that the consecutive four bits of the parity matrix shown in FIG. 3 correspond to the four input-/output data bits of one IC memory package, for the case of FIG. 4(c), and the consecutive eight bits of the parity matrix shown in FIG. 3 correspond to the eight input/output data bits of one IC memory package, for the case of FIG. 4(d).

The embodiment of the present invention assures a high error detecting probability under the conditions explained with FIG. 3.

In the foregoing description, first generation 1 M bits DRAMs, second generation 4 M bits DRAMs, and third generation 8 M bits DRAMs have been used. The present invention is not limited only to such DRAMs, but the invention is also applicable to other generation IC memory packages.

Furthermore, the invention is not limited only to the memory expansion method shown in FIG. 1, but various other types of memory expansion methods may be used. Still further the invention is not limited only to the error correcting/detecting codes shown in FIG. 3, but other parity matrices may be used.

As described so far, according to the present invention, generation change of IC memory packages caused by high integration can be dealt with by using compatible error correcting/detection codes. It is possible to provide a memory device capable of reducing the minimum memory capacity and obtaining a high error detecting ability and high reliability, by using multiple-bit structure IC memory packages.

IC memory packages of several generations can be dealt with. Therefore, with a memory device applying the present invention method, inexpensive IC memory packages can be used efficiently at anytime.

We claim:

1. A data error correcting/detecting system for memory devices, comprising:

a first memory device being structured using N (N is an integer 2 or larger) memory packages of n-bit (n is an integer 3 or larger) data structure of a first generation;

a second memory device being structured using M (M is an integer satisfying M≦N) memory packages of a second generation having a larger memory capacity than a memory package of the first generation, said second memory device having a larger memory capacity than said first memory device, said first and second memory devices having the same data bit length, and said system usable for both first and second memory devices; and means connectable to said first and second memory devices, for correcting/detecting an error of a data bit of said connected memory device, said data error correcting/detecting means including:

means connectable to said first and second memory devices, for reading said data bit from, and writing said data bit in, said connected memory device;

means for adding check bits to data when writing said data in said connected memory device; and means for performing, when reading said data from said connected memory device, correction of one bit error, detection of two bit errors, and detection of three or more bit errors of an n-bit block, within the total code bit length of a sum of said data bit length and said added check bit length, in accordance with said check bits added to said read-out data, wherein said total code bit length is selected as an n's multiple, within a range longer than the total code bit length necessary for detecting three or more bit errors of an n-bit block of said first memory device, and shorter than the total code bit length necessary for detecting three or more bit errors of an m-bit block of said second memory device.

2. A data error correcting/detecting system for memory devices, comprising:

a first memory device being structured using a plurality of memory packages of a first generation;

a second memory device being structured using N (N is an integer 2 or larger) memory packages of n-bit (n is an integer 3 or larger) data structure of a second generation;

a third memory device being structured using M (M is an integer satisfying M≦N) memory packages of a third generation having a larger memory capacity than a memory package of the second generation, said third memory device having a larger memory capacity than said second memory device, said first, second and third memory devices having the same data bit length, and said system usable for both first, second and third memory devices; and means connectable to said first, second and third memory devices, for correcting/detecting an error of a data bit of said connected memory device, said data error correcting/detecting means including:

means connectable to said first, second and third memory devices, for reading said data bit from, and writing said data bit in, said connected memory device;

means for adding check bits to data when writing said data in said connected memory device; and means for performing, when reading said data from said connected memory device, correction of one bit error, detection of two bit errors, and detection of three or more bit errors of an n-bit block, within the total code bit length of a sum of said data bit length and said added check bit length, in accordance with said check bits added to said read-out data, wherein said total code bit length is selected as an n's multiple, within a range longer than the total code bit length necessary for detecting three or more bit errors of an n-bit block of said second memory device, and shorter than the total code bit length necessary for detecting three or more bit errors of an m-bit block of said third memory device, and said first memory device has the same total code bit length as said second memory device, to match the total code bit length necessary for detecting three or more bit errors of an n-bit block of said second memory device.

3. A data error correcting/detecting system according to claim 1, wherein in both the cases of connecting said second memory device and connecting said third memory device, the data bits of each memory package of said connected memory device is consecutively assigned to the data bits of said data bit read/write means.

4. A data error correcting/detecting system according to claim 2, wherein in both the cases of connecting said second memory device and connecting said third memory device, the data bits of each memory package of said connected memory device is consecutively assigned to the data bits of said data bit read/write means.

* * * * *